United States Patent [19]

Miller

[11] Patent Number: 5,787,990
[45] Date of Patent: Aug. 4, 1998

[54] TOOL FOR RENOVATING, AERATING, DETHATCHING, MULCHING OR SEEDING LAWNS AND SOIL

[76] Inventor: William M. Miller, 2625 W. 93rd Pl., Evergreen Park, Ill. 60805

[21] Appl. No.: 664,474

[22] Filed: Jun. 17, 1996

[51] Int. Cl.[6] .............................................. A01B 45/00
[52] U.S. Cl. .......................... 172/21; 172/378; 172/381; 111/92
[58] Field of Search ...................... 172/21, 22, 371–381; 111/92, 82

[56] References Cited

U.S. PATENT DOCUMENTS

| 2,020,571 | 11/1935 | Pick | 172/21 |
|---|---|---|---|
| 2,530,886 | 11/1950 | Maisel | 280/48 |
| 2,816,495 | 12/1957 | Brooks | 97/40 |
| 2,966,218 | 12/1960 | Johnson | 172/21 X |
| 2,975,735 | 3/1961 | Purvance | 172/21 |
| 3,031,018 | 4/1962 | Smithers | 172/41 |
| 3,605,907 | 9/1971 | Schuring et al. | 172/378 |
| 3,747,687 | 7/1973 | Bodine | 172/21 X |
| 4,094,363 | 6/1978 | McCoomb | 172/21 X |
| 4,192,387 | 3/1980 | Stinson | 172/21 |
| 4,336,845 | 6/1982 | Kolb | 172/349 |
| 4,607,704 | 8/1986 | Kepes | 172/21 X |
| 5,001,858 | 3/1991 | Frazar | 47/8 |
| 5,014,791 | 5/1991 | Kure | 172/21 |
| 5,488,917 | 2/1996 | Santoli et al. | 172/21 X |

FOREIGN PATENT DOCUMENTS

| 641179 | 8/1950 | United Kingdom | 172/21 |
|---|---|---|---|
| 913349 | 12/1962 | United Kingdom | 172/21 |

OTHER PUBLICATIONS

How To Turn Your Spare Hours Into $1,200 A Week, Practical Homeowner, vol. II, No. 8, p. 95, Oct. 1987.

*Primary Examiner*—Terry Lee Melius
*Assistant Examiner*—Victor Batson
*Attorney, Agent, or Firm*—Rockey, Milnamow & Katz

[57] ABSTRACT

An improved lawn renovating tool for aerating, mulching, dethatching, seeding and fertilizing lawns which is lightweight and easy to use. The tool has a lightweight handle, an elongate tubular shaft with a seed or fertilizer feeding and soil breaking element attached to the bottom portion of the elongate shaft. The seed or fertilizer feeding and soil breaking element is a partially triangular tube having spike-tooth rotatable wheel-type attachments along its base and a series of holes for feeding seed or fertilizer from a feed hopper mounted on the elongate shaft. A damper and control pedal are also included, regulating the flow of seed or fertilizer.

23 Claims, 5 Drawing Sheets

FIG. 3
FIG. 4
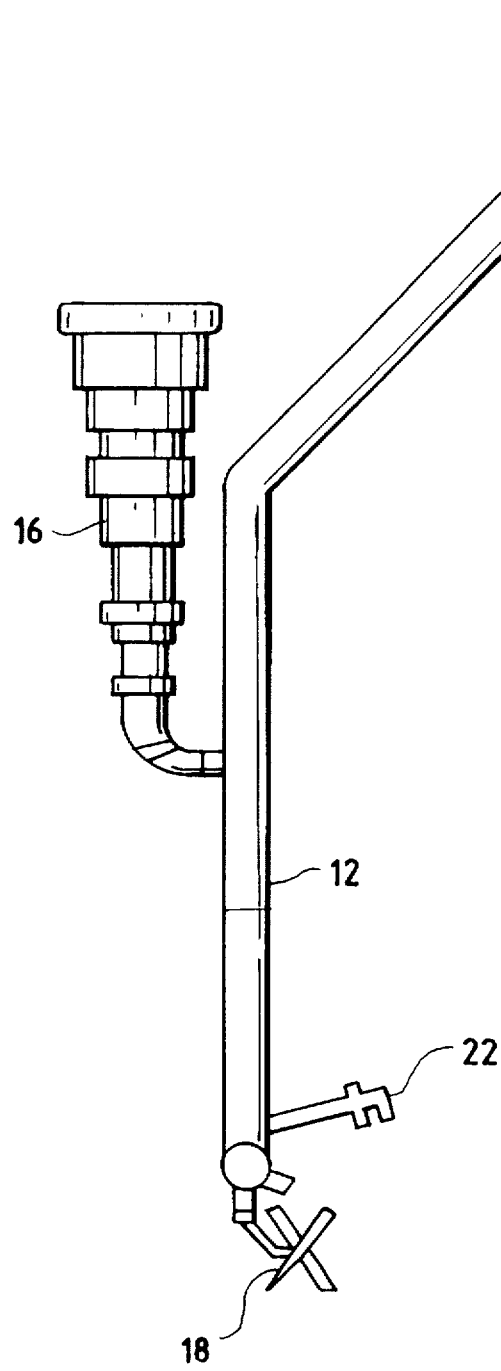
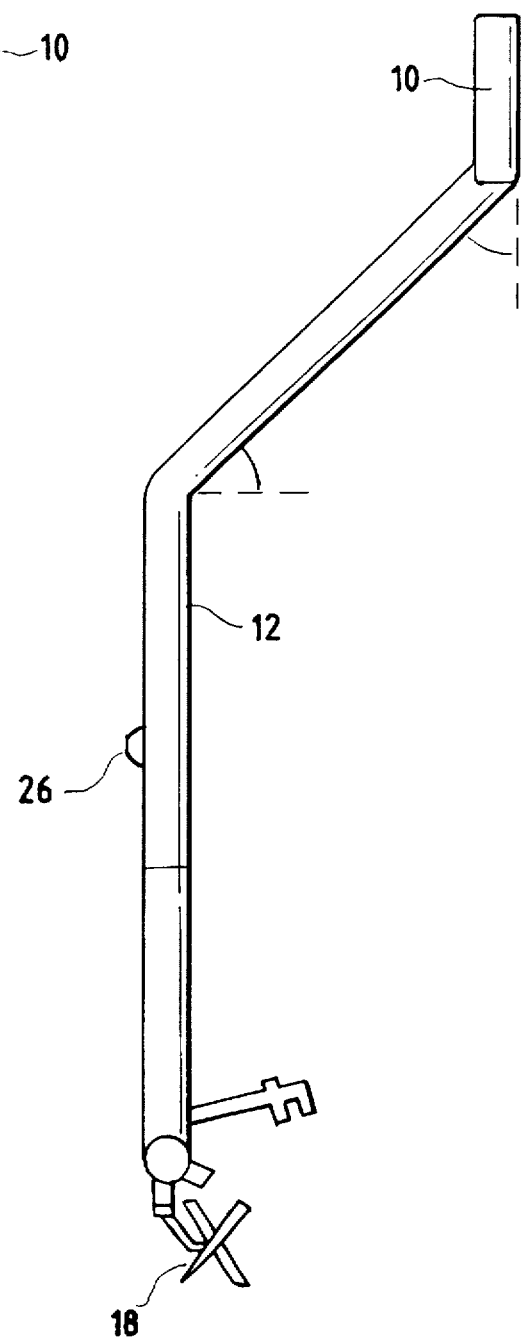

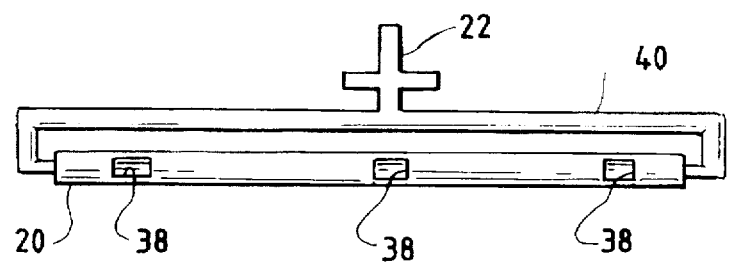
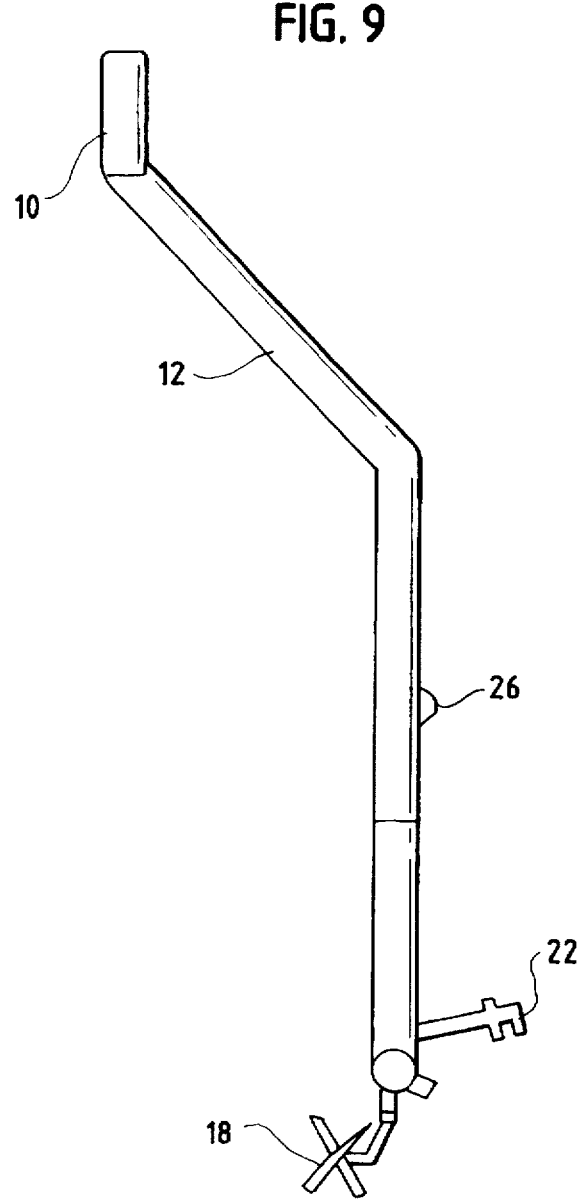

TOOL FOR RENOVATING, AERATING, DETHATCHING, MULCHING OR SEEDING LAWNS AND SOIL

BACKGROUND OF THE INVENTION

This invention relates to an improved lawn renovating tool, and particularly an improved tool for aerating, mulching, dethatching, seeding and fertilizing lawns which is lightweight and easy to use.

A number of tools for gardening, cultivating lawns or comminuting soil have been used or suggested as illustrated in U.S. Pat. Nos. 1,081,437, 2,188,644, 2,530,886, 2,816, 495, 3,031,018, 3,605,907, 4,094,363, 4,300,461 and 4,336, 845. As shown in those patents, such tools have a variety of designs and functions depending upon their intended uses. Several of the tools described in the patents referred to above are manual or portable tools, designed to be operated by one person. Thus, one of the purposes of those designs is to provide tools which are lightweight and easy to use.

However, the tools described in the foregoing patents have several disadvantages. Some of the tools have limited utility, i.e., they have only one purpose and function. Several of the tools, while designed to be lightweight, can be difficult to operate due to the materials used for their construction or the amount of force which must be exerted by the user. In particular, most of the available tools on the market are of very limited utility to those persons troubled by back problems.

It is accordingly an object of the present invention to provide a lawn renovating tool which overcomes the foregoing disadvantages.

It is a more specific object of the present invention to provide a lawn renovating tool which is multi-functional and can be used to aerate, mulch, dethatch, seed and fertilize lawns with only minor adjustments.

It is another object of the present invention to provide a lawn renovating tool which is lightweight.

It is yet a further object of the present invention to provide a lawn renovating tool which can be easily used by all persons, especially persons with back problems.

SUMMARY OF THE INVENTION

The concepts of the present invention reside in a lawn renovating tool primarily constructed from lightweight materials, such as PVC (polyvinylchloride) pipe tubing and other heavy duty plastics, in conjunction with conventional spike-tooth rotatable wheel-type soil breaking attachments to provide an improved tool which is lightweight and easy to use. It has been found that the use of such lightweight materials provides the ability to construct a versatile tool for aerating, mulching, dethatching, seeding and fertilizing lawns which is easy to use and easy to maintain.

In accordance with the preferred practice of the invention, the lawn renovating tool of the present invention is formed of a lightweight handle with an elongate tubular shaft which is hollow along a substantial portion of the shaft. The handle and elongate shaft are preferably made of the same lightweight material. The shaft extends out from the handle at an angle for about one-half of its length and then bends inwardly to form another angle and extends downwardly. The shaft also is provided with a plurality of openings along its lower length for attachment of seed or fertilizer feeding and soil breaking elements. In the preferred embodiment of the invention, there is provided at least one opening on the lower portion of the shaft for attachment of a feed hopper and at least two aligned openings on opposite sides of the lower portion of the shaft for attachment of a seed or fertilizer feeding and soil breaking element.

Preferably, the seed or fertilizer feeding and soil breaking element is a hollow partially triangular tube, made from the same materials as the handle and shaft, with an additional tube extending from the base and up through the upper apex of the partially triangular tube. The portion of the additional tube above the upper apex is provided with at least two aligned openings on opposite sides of the tube for connection with the elongate shaft extending from the handle. The partially triangular tube is also provided with openings along the rear portion of its base for feeding seed or fertilizer. The base of the partially triangular tube is further provided with an interior damper and an exterior foot control pedal for feeding seed or fertilizer as well a series of spike-tooth rotatable wheel-type attachments for breaking and aerating soil. In the preferred embodiment of the invention, the hollow partially triangular tube is detachable and can be rotated around the shaft to provide greater depths of penetration of the spike-tooth rotatable wheel-type attachments in the soil or lawn for aerating and other purposes.

DESCRIPTION OF THE DRAWINGS

FIG. 3 is a side elevation of the lawn renovating tool illustrated in FIG. 1.

FIG. 4. is a side elevation of the lawn renovating tool illustrated in FIG. 2.

FIG. 8. is a front elevation of damper and control pedal of the lawn renovating tool illustrated in FIG. 2.

FIG. 9. is a side elevation of the lawn renovating tool illustrated in FIG. 2 with the seed or fertilizer feed and soil breaking element rotated 180° around the elongate shaft.

DETAILED DESCRIPTION OF THE INVENTION

Figure 1:
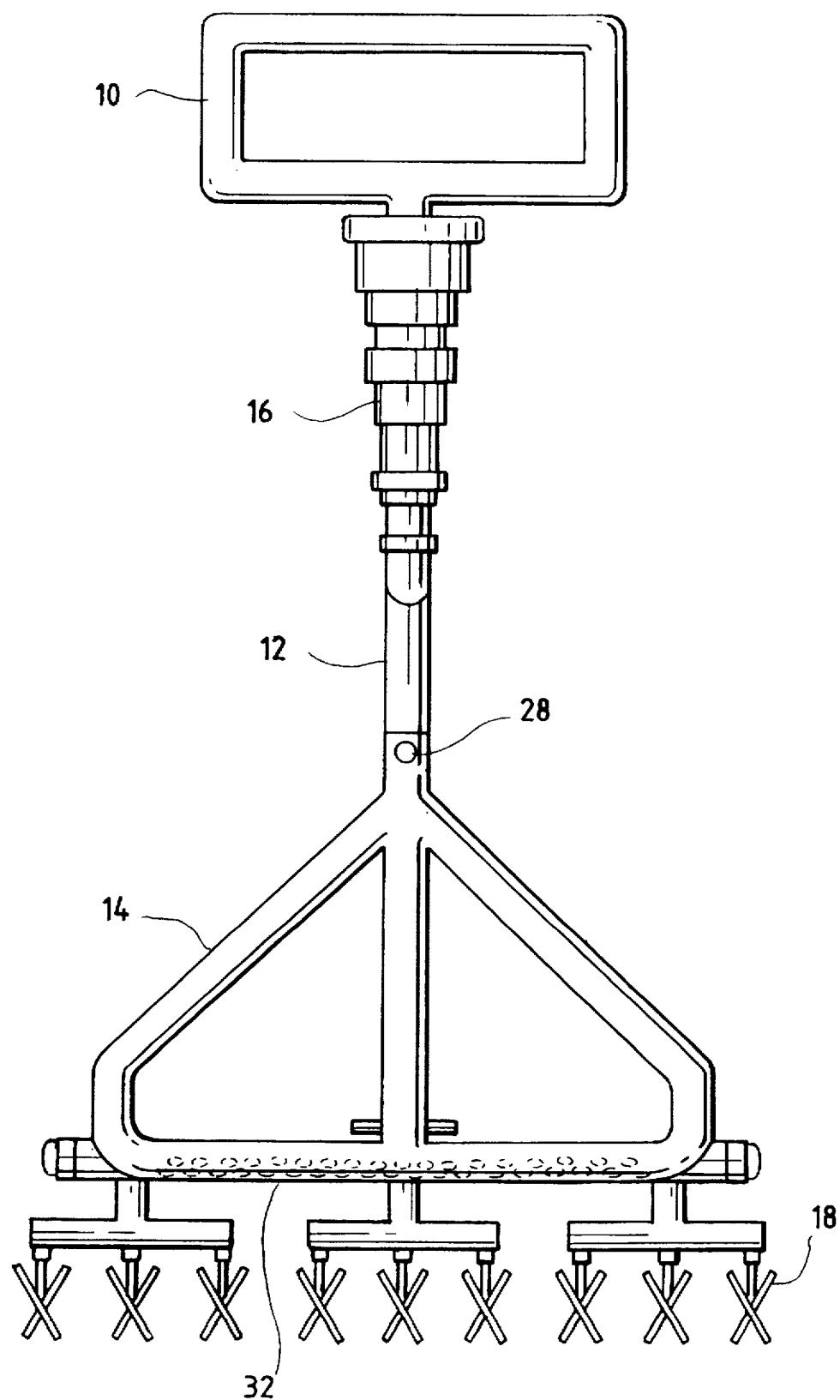
FIG. 1 is a front elevation of a lawn renovating tool of the present invention.
Figure 2:
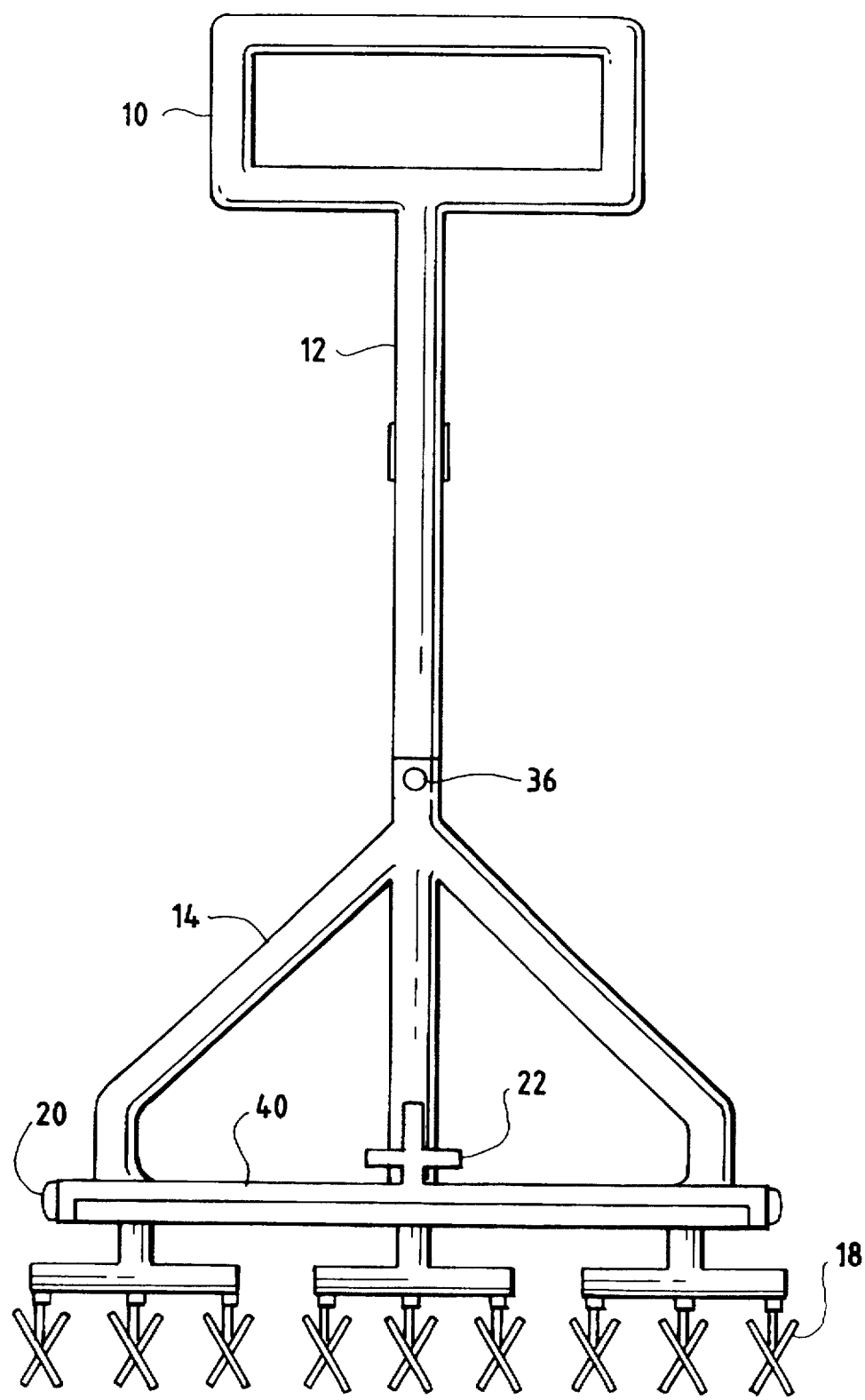
FIG. 2 is a rear elevation of the lawn renovating tool illustrated in FIG. 1 without the feed hopper.

The lawn renovating tool of the present invention is illustrated in FIGS. 1–9 of the drawings. As shown in FIGS. 1 and 2, the tool has a handle 10 with an elongate shaft 12 extending from the handle and a partially triangular tube 14 attachable to the elongate shaft. Positioned on the elongate shaft 12 above the triangular tube 14 is a feed hopper 16 as shown in FIG. 1. Mounted on the base portion of the partially triangular tube is a series of spike-tooth rotatable wheel type attachments 18 for breaking and aerating soil as shown in FIG. 1. As shown in FIG. 2, an exterior foot control pedal 22 for adjusting an interior damper (shown in FIG. 8) for regulating the feeding of seed or fertilizer is also mounted on the rear of the base portion of the partially triangular tube.

Figure 5:
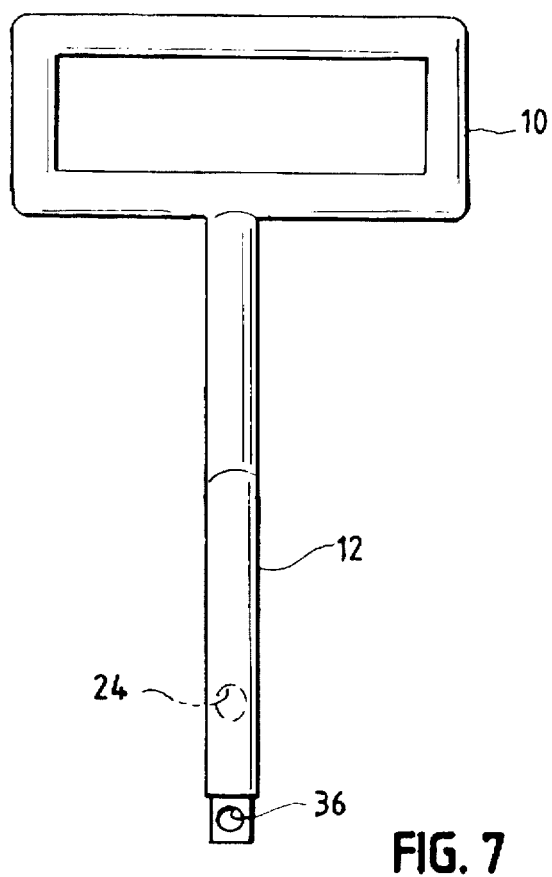
FIG. 5. is a front elevation of the handle of the lawn illustrated in FIG. 1.
Figure 6:
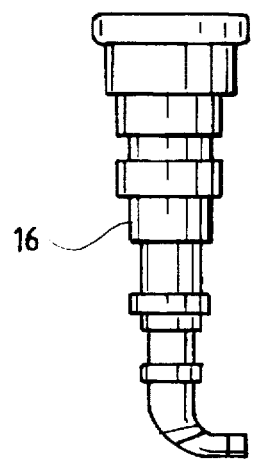
FIG. 6. is a side elevation of the feed hopper of the lawn renovating tool illustrated in FIG. 1.

As is perhaps best illustrated in FIGS. 3–7, the handle 10 and elongate shaft 12 are attached or formed so that the elongate shaft extends out from the handle at an angle for approximately one-half of its length and then bends inwardly to form another angle and extend substantially downwardly. The angle of extension or bend is approximately 45° as measured from the broken lines drawn on FIG. 4. As shown in FIG. 5, approximately half-way down the lower front portion of the elongate shaft 12 there is provided at least one opening 24 for attachment of the feed hopper 16 shown in FIG. 6. And, as shown in FIG. 4, a plug 26 is inserted into the opening when the feed hopper is not attached.

Figure 7:
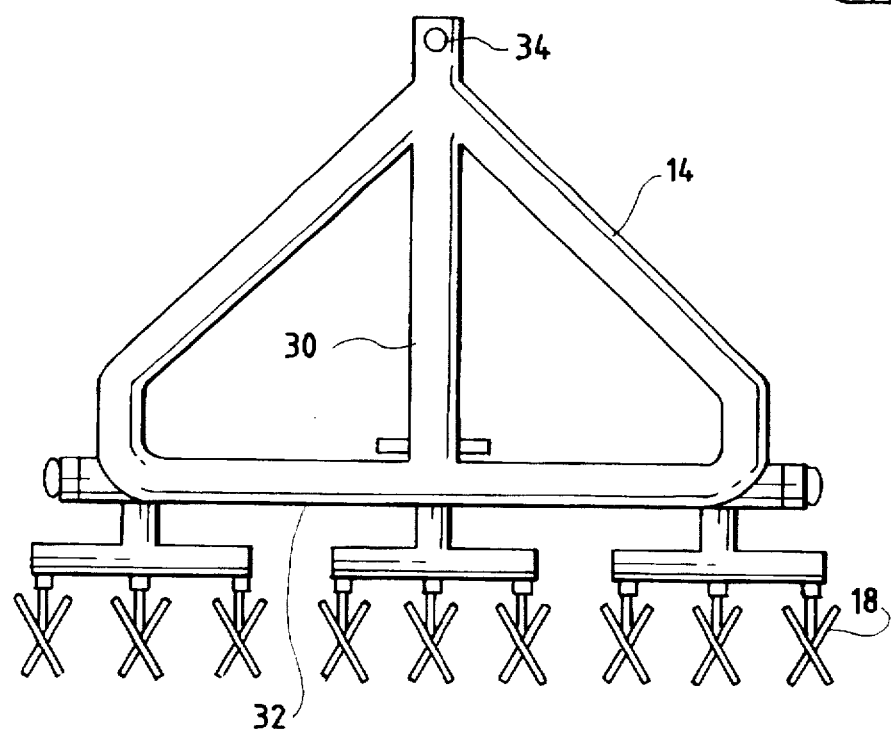
FIG. 7. is a front elevation of the seed or fertilizer feed and soil breaking element of the lawn renovating tool illustrated in FIG. 1.

As also shown in FIGS. 1, 2 and 5, at least two aligned openings 28 and 36 are provided on opposite sides of the lower portion of elongate shaft 12 for attachment to the partially triangular tube 14 shown in FIG. 7. As is shown in FIG. 7, partially triangular tube 14 is provided with an additional tube 30 extending from the base 32 and up through the upper apex of the partially triangular tube. The upper portion of the additional tube 30 above the upper apex is provided with at least two aligned openings 34 on opposite sides of the tube (the front opening shown in FIG. 7 while the back opening is aligned therewith), for connection with the elongate shaft 12 extending from the handle 10 of FIG. 5.

A conventional nut and bolt or clevis joint and hitch pin arrangement (not shown) is used once the openings 28 and 36 of the elongate shaft 12 and openings 34 additional tube 30 of of the partially triangular tube, shown in FIGS. 1, 2, 5 and 7, respectively, are aligned for secure fastening of one to the other to provide the configuration shown in FIG. 4. If the configuration of FIG. 9 is desired, the bolt or hitch pin can be easily removed, the elongate shaft 12 and handle 10 rotated 180° and the openings 28, 36 and 34 of FIGS. 5 and 7, respectively, aligned and securely fastened by inserting the bolt or clevis joint through the openings and securing the bolt or clevis joint on the other side with nut or hitch pin.

The partially triangular tube 14, shown in FIGS. 1, 2 and 7, has a base 32 which has a series of small holes provided on the rear portion shown in broken lines in FIG. 1. The series of small holes consist of anywhere from 25 to 100 holes for feeding seed or fertilizer to the soil or lawn. The base 32 has end portions extending out for insertion of an interior damper 20 (shown partially in FIG. 2) and an exterior control pedal 22 (shown fully in FIG. 2). The damper 20 and pedal 22 are shown detached from the base in FIG. 8, with the damper 20 having cutout sections 38 across its length. As also shown in FIG. 8, the damper 20 and control pedal 22 are removably attached to each other by a bar or rod 40, which as shown in FIG. 2, is exterior to base 32 like pedal 22. When the lawn renovating tool of the present invention is assembled, the damper 20 is placed inside the base 32 and the control pedal 22 is attached to the damper by bar or rod 40. Appropriate fittings are also placed on the ends of base 32 to allow for the base to be closed and the rod ends connected to the damper to extend therethrough. Once assembled, the damper 20 regulates the flow of seed for fertilizer from the base by pushing down or up on pedal 22.

As shown in FIGS. 1, 2 and 7, a series of spike-tooth rotatable wheel-type attachments 18 are mounted to the bottom of the base 32. Those attachments are conventional aerating and soil breaking tools as disclosed in U.S. Pat. Nos. 3,605,907 and 4,336,845. The attachments 18 are preferably fixedly mounted to the base.

The lawn renovating tool of the present invention is generally fabricated in large measure from heavy duty yet light weight plastic materials, preferably PVC pipe or tubing. The handle 10, elongate shaft 12, feed hopper 16 and partially triangular tube 14 are constructed from PVC pipe or tubing, joints and elbows. The damper 20 and control pedal 22 are also constructed from PVC pipe or tubing while the spike-tooth rotatable wheels are constructed from conventional metals. The PVC pipe or tubing has the appropriate dimensions, joints, elbows, and plugs to provide adequate attachment of the parts described above to withstand the pressure of pulling or pushing the lawn renovating tool.

In the preferred embodiment of the present invention, the handle, elongate shaft, partially triangular tube, damper and control pedal are constructed from straight pieces of PVC pipe or tubing joined by PVC elbows and joints. Likewise, the spike-tooth rotatable wheels, in the preferred embodiment, are connected to the base of the partially triangular tube using PVC elbows and joints. Of course, the elbows and joints are dimensioned to provide secure attachment of the parts to each other. The diameter of the PVC pipe used for the handle, elongate shaft and partially triangular tube is approximately 1 to 2 inches, preferably 1.5 inches. The diameter of the damper is approximately 0.25 to 0.5 inches less than the diameter of the base. The diameter of the control pedal and bar or rod is approximately 0.5 to 1 inch, with 0.5 inches being preferred. And, the diameter of the PVC pipe or tubing used to connect the spike-tooth rotatable wheels to the base is approximately 0.5 to 1.5 inches, with 0.75 inches being preferred. Of course, the tool of the present invention could be fabricated using other techniques, such as injection molding, to reduce the number of parts involved in assembling the tool.

Use of the lawn renovating tool of the present invention is best illustrated by reference to FIGS. 3, 4 and 9. If the tool is used for aerating, mulching, dethatching, the configuration of FIG. 4 would be used. The user simply places his or her hands on the handle 10 to push or pull the lawn renovating tool forward or backwards and applies pressure on the handle 10 downward so that the spike-tooth rotatable wheel-type attachments engage the soil or lawn. If deeper penetration of the spike-tooth rotatable wheel-type attachments are required, more pressure downwardly can be applied on the handle. Alternatively, the bolt or hitch pin holding the elongate shaft 12 and partially triangular tube 14 together can be removed, the handle and shaft rotated 180°, and the bolt or hitch pin replaced. That configuration is shown in FIG. 9 and allows for deeper penetration of the spike-tooth rotatable wheel-type attachments through a push forward or pull backward motion.

If the lawn renovating tool of the present invention is used for seeding or fertilizing the soil or lawn, then the configuration of FIG. 3 is employed. The plug 26 of FIG. 4 is removed and replaced by feed hopper 16 as shown in FIG. 3. Before filling the feed hopper 16 with soil or fertilizer, foot control pedal 22 is positioned so that the interior damper is in the down position or closed. The seed or fertilizer is then placed in the feed hopper 16. The user then places his or her hands on the handle to push or pull the tool, starting the flow of seed or fertilizer from the series of small holes in the base shown in FIG. 1 by pushing the foot pedal up. The flow of seed or fertilizer can be controlled by then pushing up or down on the exterior pedal control. And, of course, if the lawn renovating tool is to be used for aerating, mulching and dethatching at the same time as seeding or fertilizing, the configuration of FIG. 3 would be employed.

It would be understood that the present invention has been described with respect to certain embodiments which are not meant to and should not be construed to limit the invention. Thus, the invention disclosed could be provided with, for example, a larger or smaller handle, an adjustable handle or elongate shaft, a larger or smaller feed hopper, a spring-loaded or hand operated damper control system, various damper control settings, a motor or additional attachments without departure from the spirit of the invention. Those skilled in the art will understand that variations from the embodiments in terms of materials used and construction described herein may be made without departing from the invention as claimed in the appended claims.

What is claimed is:

1. A multi-functional lightweight lawn renovating tool comprising:

a handle, a substantially hollow elongate shaft extending from said handle, a feed hopper detachably mounted to said elongate shaft, and a substantially hollow partially triangular tube attachable to said elongate shaft, said partially triangular tube laving a base portion, wherein said bas e portion of said partially triangular tube is provided with a series of holes for feeding seed or fertilizer from said feed hopper to soil or lawns, an interior damper and exterior control pedal attached to the damper for regulating the flow of seed or fertilizer from said base portion to soil or lawns and a series of spike-tooth rotatable wheel-type attachments mounted on the bottom of said base portion to aerate, mulch or dethatch soil or lawns.

2. The lawn renovating tool of claim 1 wherein said elongate shaft has a lower portion which is provided with at least two aligned openings and said partially triangular tube has an additional tube extending from said upper apex of said triangular tube with at least two aligned openings wherein said aligned openings of said elongate shaft and said triangular tube can be positioned to connect with each other and then securely fastened using a nut and bolt or clevis joint and hitch pin arrangement.

3. The lawn renovating tool of claim 2 wherein the interior damper and exterior control pedal are fabricated from PVC pipe or tubing.

4. The lawn renovating tool of claim 2 wherein said handle and said elongate shaft can be rotated 180° around said elongate shaft and then secured to said partially triangular base to alter the degree of penetration of the soil or lawn by the spike-tooth rotatable wheel-type attachments when aerating, mulching or dethatching.

5. The lawn renovating tool of claim wherein said elongate shaft extends outwardly from said handle for about one-half of its length and then downwardly to the partially triangular tube to form approximately a 45° angle in the elongate shaft.

6. The lawn renovating tool of claim 1 wherein said elongate shaft h as a plug in place of the feed hopper when the feed hopper is detached.

7. The lawn renovating tool of claim 1 wherein the handle, the hollow elongate shaft and the partially triangular tube are fabricated from PVC pipe or tubing.

8. The lawn renovating tool of claim 1 wherein the feed hopper is fabricated from PVC pipe or tubing.

9. The lawn renovating tool of claim 1 wherein the interior damper and exterior control pedal are fabricated from PVC pipe or tubing.

10. The lawn renovating tool of claim 1 wherein the handle, elongate shaft and partially triangular tube are connected using PVC joints and elbows.

11. The lawn renovating tool of claim wherein said interior damper and exterior control pedal are connected to each other using PVC pipe or tubing and attached to the base of the partially triangular tube using PVC fittings.

12. A multi-functional lightweight lawn renovating tool comprising:

a handle, a substantially hollow elongate shaft extending from said handle, a feed hopper detachably mounted to said elongate shaft, a substantially hollow partially triangular tube attachable to said elongate shaft, said partially triangular tube having a base portion and an upper apex, said upper apex located at the point of attachment to said elongate shaft, and a substantially hollow tube extending from said upper apex of said partially triangular tube to said base portion of said partially triangular tube, wherein said base portion of said partially triangular tube is provided with a series of holes for feeding seed or fertilizer from said.feed hopper through said elongate shaft, said partially triangular tube and said hollow tube to soil or lawns and said base portion is further provided with a series of spike-tooth rotatable wheel-type attachments mounted on the bottom of the base to aerate, mulch or dethatch soil or lawns.

13. The lawn renovating tool of claim 12 wherein said elongate shaft has a lower portion which is provided with at least two aligned openings and said partially triangular tube has an additional tube extending from said upper apex of said triangular tube with at least two aligned openings wherein said aligned openings of said elongate shaft and said triangular tube can be positioned to connect with each other and then securely fastened using a nut and bolt or clevis joint and hitch pin arrangement.

14. The lawn renovating tool of claim 13 wherein said handle and said elongate shaft can be rotated 180° around said elongate shaft and then secured to said partially triangular base to alter the degree of penetration of the soil or lawn by the spoke-tooth rotatable wheel-type attachments when aerating, mulching or dethatching.

15. The lawn renovating tool of claim 12 wherein said elongate shaft extends outwardly from said handle for about onehalf of its length and then downwardly to the partially triangular tube to form approximately a 45° angle in the elongate shaft.

16. The lawn renovating tool of claim 12 wherein said elongate shaft has a plug in place of the feed hopper when the feed hopper is detached.

17. The lawn renovating tool of claim 12 wherein the handle, the hollow elongate shaft, the partially triangular tube and the hollow tube are fabricated from PVC pipe or tubing.

18. The lawn renovating tool of claim 12 wherein the feed hopper is fabricated from PVC pipe or tubing.

19. The lawn renovating tool of claim 1 wherein the handle, elongate shaft, partially triangular tube and hollow tube are connected using PVC joints and elbows.

20. The lawn renovating tool of claim 12 wherein said base portion of said partially triangular tube has an interior damper and exterior control pedal attached to said damper for regulating the flow of seed or fertilizer from said base portion to soil or lawns.

21. The lawn renovating tool of claim 20 wherein the interior damper and exterior control pedal are fabricated from PVC pipe or tubing.

22. The lawn renovating tool of claim 20 wherein the interior damper and exterior control pedal are fabricated from PVC pipe or tubing.

23. The lawn renovating tool of claim 20 wherein said interior damper and exterior control pedal are connected to each other using PVC pipe or tubing and attached to the base of the partially triangular tube using PVC fittings.

* * * * *